United States Patent [19]

Müller et al.

[11] 4,223,607
[45] Sep. 23, 1980

[54] OPTO-ELECTRONIC MEASURING APPARATUS, PARTICULARLY FOR A PROJECTILE DETONATOR

[75] Inventors: Uno Müller, Nuremberg; Dietmar Stützle, Lauf, both of Fed. Rep. of Germany

[73] Assignee: Diehl, Nuremberg, Fed. Rep. of Germany

[21] Appl. No.: 635,679

[22] Filed: Nov. 24, 1975

[30] Foreign Application Priority Data

Nov. 28, 1974 [DE] Fed. Rep. of Germany ....... 2456162

[51] Int. Cl.³ ............................................. F42C 13/02
[52] U.S. Cl. .................................................. 102/213
[58] Field of Search .................. 102/70.2 P, 213, 214; 235/151.32; 244/3.17

[56] References Cited

U.S. PATENT DOCUMENTS 3,376,411  4/1968  Montani et al. ..................... 244/3.17

*Primary Examiner*—Charles T. Jordan
*Attorney, Agent, or Firm*—Haseltine, Lake & Waters

[57] ABSTRACT

An opto-electronic measuring apparatus, in particular for a projectile detonator, for the delivery of a signal upon the reaching of a predetermined distance between a moving body and a surface, whereby the measuring apparatus incorporates a transmitter emitting impulses which are rendered optical through a lens at a transmission frequency; and a receiver with a receiver-amplifier for receiving the portion of these optical impulses which are scattered back from the surface.

7 Claims, 9 Drawing Figures

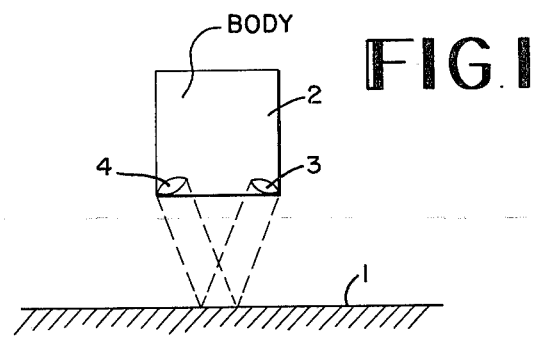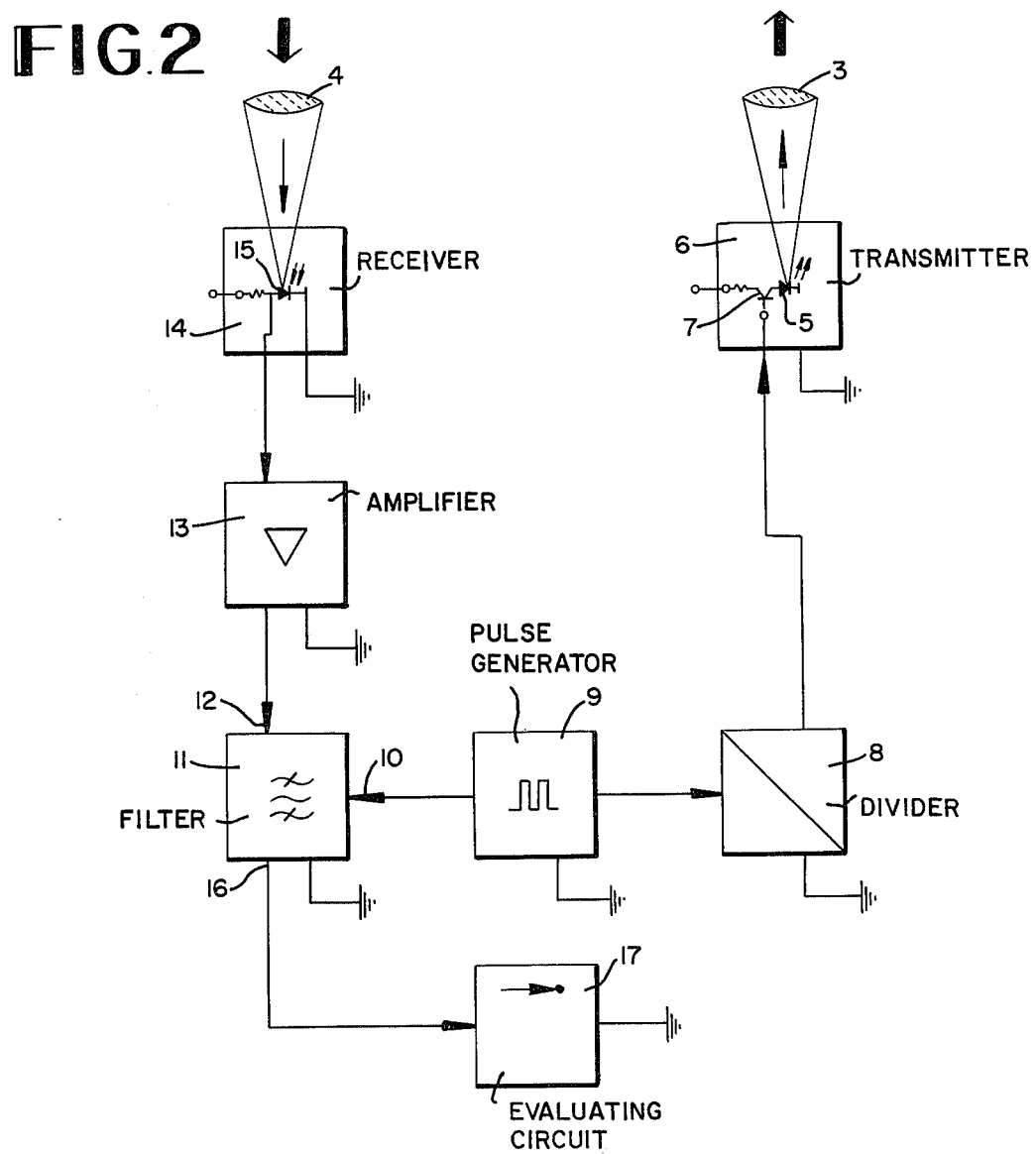

OPTO-ELECTRONIC MEASURING APPARATUS, PARTICULARLY FOR A PROJECTILE DETONATOR

FIELD OF THE INVENTION

The present invention relates to an opto-electronic measuring apparatus, in particular for a projectile detonator, for the delivery of a signal upon the reaching of a predetermined distance between a moving body and a surface, whereby the measuring apparatus incorporates a transmitter emitting impulses which are rendered optical through a lens at a transmission frequency; and a receiver with a receiver-amplifier for receiving the portion of these optical impulses which are scattered back from the surface.

DISCUSSION OF THE PRIOR ART

It has been shown that, through the intermediary of a measuring apparatus of the above-mentioned type, distances in the range of within a few meters may be readily determined, principally is this attained in that the light which is projected from the transmitter is sharply collimated by a collecting or focusing lens. When this collimated light beam impinges against a surface, for example, at a spacing of 2 meters, light is then scattered back by the surface. In the event that this spacing has the predetermined distancing at which the measuring apparatus is to deliver the signal, and the focusing lens which is associated with the receiver is for this purpose directed towards the area of the surface in which there impinges the collimated light, then the lens associated with the receiver absorbs stray light and irradiates the light-sensitive receiver.

In order to prevent the signal from also being initiated when stray light impinges against the focusing lens associated with the receiver, which is not the result of the light emitted from the transmitter, the transmitter should then radiate optical impulses at a predetermined transmitting frequency. The signal is initiated only when stray light impulses with the transmitting frequency appear at the receiver. In order to achieve this in actual practice is, above all, difficult in that, for this purpose, there is required an extremely narrow-banded selection, and the receiving power lies only slightly above the noise level. Components with the tolerances of their values and aging effects which must be assumed for reasons of price, do not afford that kind of selection.

SUMMARY OF THE INVENTION

Accordingly, it is an object of the present invention to provide a measuring apparatus of the above-mentioned type which is largely independent of the tolerances of the employed constructional components and their aging effects.

The foregoing object is inventively attained in that the receiver-amplifier has a band-pass filter with a narrow frequency band width range connected to the output thereof, and wherein a control or regulating circuit is connected intermediate the band-pass filter and the transmitter, which correlates to each other the median frequency of the frequency band width range of the band-pass filter and the transmission frequency of the transmitter, and with an evaluating circuit which delivers the signal being connected to the output of the filter. The narrow frequency band width of the band-pass filter in the range of, for example, 100 to 200 Hz assures that no other impulses than those impulses emanating from the transmitter and strayed back from the surface will lead to the initiation of the signal. The correlation of the median frequency of the band-pass filter and the transmitting frequency of the transmitter leads to that deviations necessitated tolerances or aging effects from a theoretical frequency reference value cannot assert themselves in a manner in which the median frequency and the transmitting frequency deviate from each other. Already small deviations, due to the narrow band width of the band-pass filter, will lead to that the impulses transmitted from the transmitter will erroneously lie outside of the band width range of the band-pass filter.

In a preferred embodiment of the invention, the transmitting frequency of the transmitter and the median band frequency of the band-pass filter are synchronized by a common control device. Preferably, the control device is hereby formed by an impulse generator and the band-pass filter is an N-path filter. Those types of filters are coilless band filters, in which the band filter characteristic is attained through a number (N) of low-pass filters and their control by means of electronic switches, in particular transistors. This circuit permits a digital operation of the measuring apparatus.

In another embodiment of the invention the transmitting frequency of the transmitter is caused to follow the median frequency of the band-pass filter by means of a regulating circuit. Employed as the input signal of the regulating circuit is a signal which is preferably filtered out of the noise level of the receiver-amplifier through intermediary of the band-pass filter.

BRIEF DESCRIPTION OF THE DRAWINGS

Advantageous embodiments of the invention may now be ascertained from the following detailed description of exemplary embodiments thereof, taken in conjunction with the accompanying drawings; in which:

FIG. 1 illustrates a body moving above a surface;

FIG. 2 shows a schematic circuit block diagram of an exemplary embodiment of the opto-electronic measuring apparatus;

DETAILED DESCRIPTION

Figure 3:
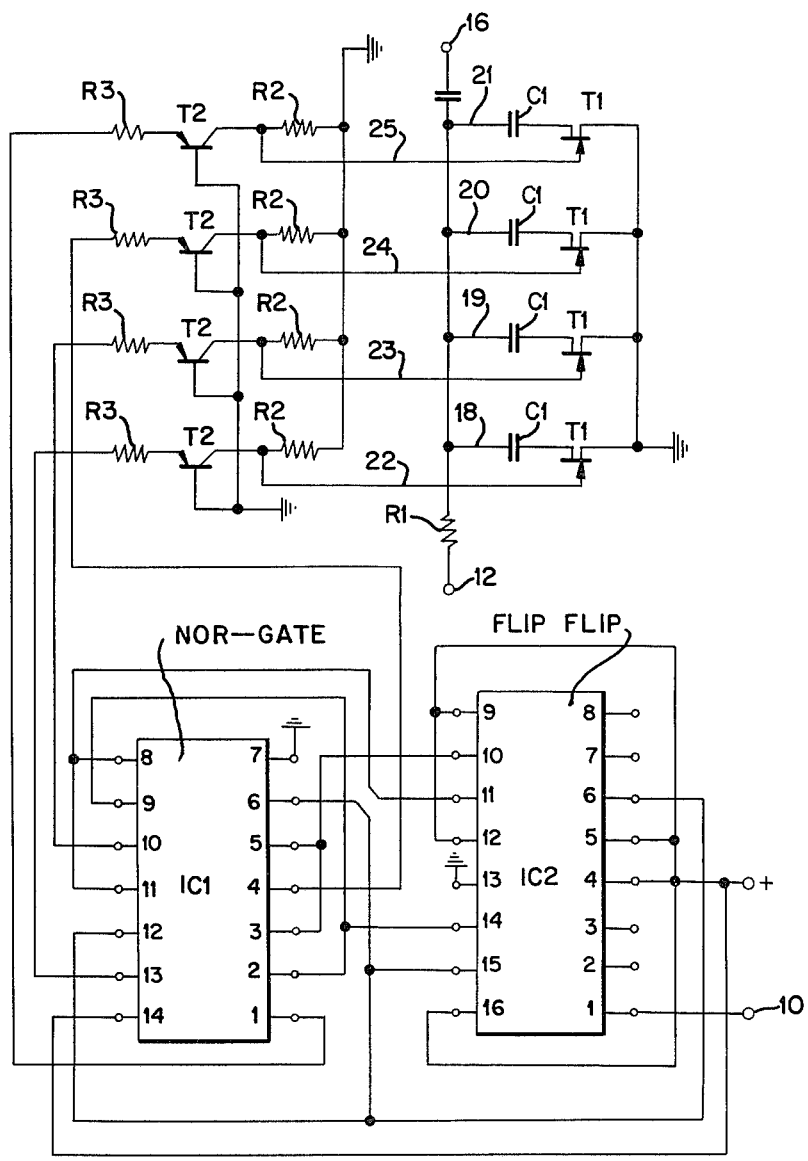
FIG. 3 shows an N-path filter with a control.

A body 2 moving over a surface 1 includes two focusing lenses 3 and 4. The axes of the lenses 3 and 4 are inclined with respect to each other at such an angle that their beam paths intersect at a predetermined distance within the meter range ahead of the body. In FIG. 1 this is the case precisely on the surface 1.

A light-emitting diode 5 of a transmitter 6 is arranged in a focal point of the lens 3. The diode 5 has a transistor 7 connected ahead thereof. The latter is switched conductively through square-wave impulses having a frequency of about 10 kHz. The transmitter thereby emits steady light impulses with the frequency of the square-wave impulses.

The square-wave impulses are derived from a divider circuit 8. Connected ahead of the latter is an impulse generator 9 which emits square-wave impulses having a frequency of 40 kHz at a keying ratio of 1:1. The divider circuit 8 ratios these square-wave impulses down to a ratio of 4:1.

The square-wave impulses of the impulse generator 9 are also switched to the control input 10 of an N-path filter 11. The N-path filter 11 includes four paths. Its median frequency hereby lies, in accordance with the indicated control frequency of the impulse generator of 40 kHz, at 10 kHz. At a signal input 12 of the band filter 11 there is located an amplifier 13 with an extremely high amplification factor. The amplifier 13 is connected to the output of a receiver 14. The latter includes a light-sensitive photodiode 15. The photodiode is located in a focal point of the focusing lens 4.

An evaluating circuit 17 is located at a signal output 16 of the N-path filter 11 which, when there appears at the receiver 14 light impulses which come from the transmitter 6, will emit the signal, respectively, initiate the detonation.

The described circuit components are connected to a voltage source, in particular a battery, whose voltage can be regulated to a constant value in case of need.

Illustrated in FIG. 3 of the drawings is the N-path filter 11 and the control therefor. Provided are four low pass filter paths 18, 19, 20 and 21. They are each built by a condenser C1 and a common resistance R1. The resistance R1 has a value of about 10 kΩ and the condensers C1 have a value of 0.22 μF. Connected in series with the condensers C1 are field-effect transistors T1. The control inputs of the field-effect transistors are presently connected to the collectors of further transistors T2, whose emitter-collector sections presently lie between two resistances R2 and R3. The transistors T2 and the resistances R1 and R3 serve for correlation of the potential. In lieu of the transistors T1 and T2, and the resistances R2, R3, there may be utilized a four-way switch constructed as an integrated component.

Each of the resistances R3 has an NOR-gate connected ahead thereof. These gates are integrated within a single component IC1. Connected ahead of the NOR-gate is a dual JK-master-slave flip-flop IC2 at whose control input 10 there is applied the square-wave impulse sequence from the impulse generator 9. Suitable as the integrated component IC1 is a component which can be obtained under No. 7402, and as an integrated component IC2 such as can be obtained under No. 7476.

Figure 9:
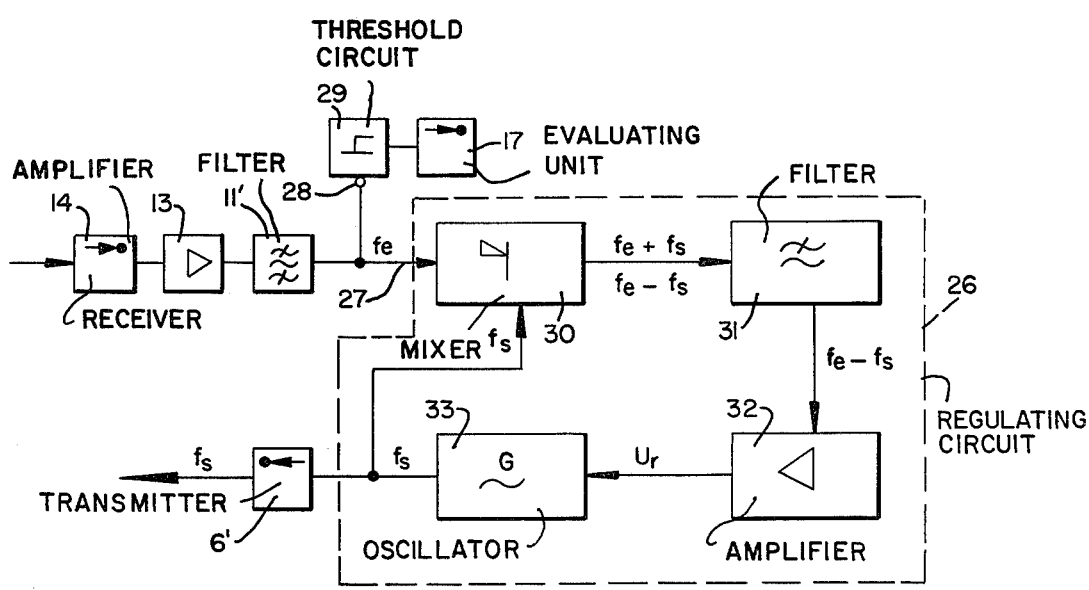
FIG. 9 illustrates a circuit block diagram of another embodiment of the invention.

The dual flip-flop IC2 and the NOR-gate IC1 divide and distribute the impulse sequence of the impulse generator 9 so that there appears at the control inputs 22, 23, 24, 25 of the transistors T1 the impulse sequences illustrated in FIG. 9. Each of the transistors T1 is switched conductively with a frequency of 10 kHz. The transistors T1 thus become attenuatingly conductive in sequence.

Correspondingly, the low-pass filter paths 18, 19, 20 and 21 are also sequentially switched in. There is thus obtained for the filter arrangement in the described example a band filter characteristic having a median frequency of 10 kHz at a band width of about 100 Hz. In the event that there thus appear at the signal input 12 impulses at a frequency of 10 kHz, these are conducted to the output 16. Deviating frequencies are not allowed to pass through by the N-path filter 11. These types of N-path filters are described, for example, in the journal "Der Electroniker" No. 11/1973.

Figure 4:
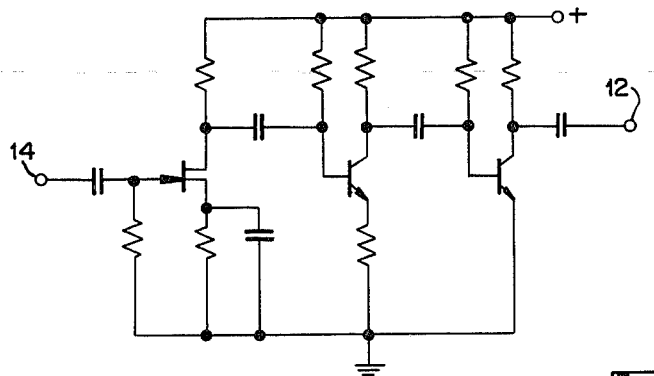
FIG. 4 illustrates an amplifier circuit.

Illustrated in FIG. 4 of the drawings is an exemplary circuit for the amplifier 13. The amplifier operates with a field-effect transistor and two further transistors.

Figure 5:
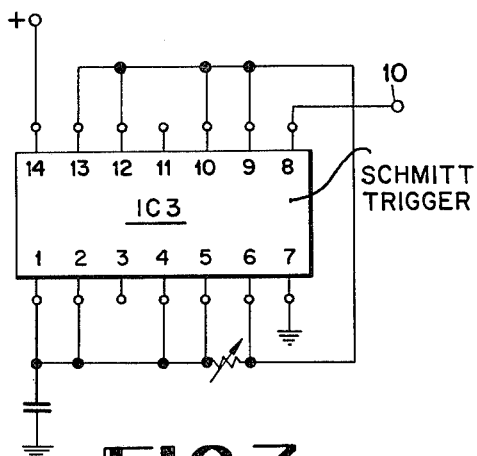
FIG. 5 illustrates an impulse generator.

Illustrated in FIG. 5 is the construction of an impulse generator 9. The latter is formed by a Schmitt-Trigger IC3. For example, suitable as an integrated component is one such which is obtainable under No. 7413.

Figure 6:
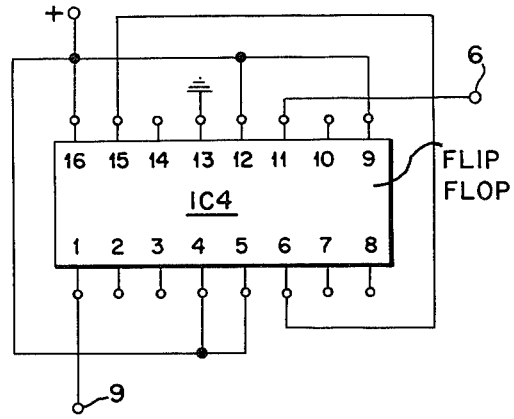
FIG. 6 illustrates a frequency divider.

FIG. 6 of the drawings illustrated the construction of the divider circuit 8. The latter consists of a dual JK-master-slave flip-flop IC4. Employable as an integrated component is a component which is obtainable under No. 7476.

Figure 7:
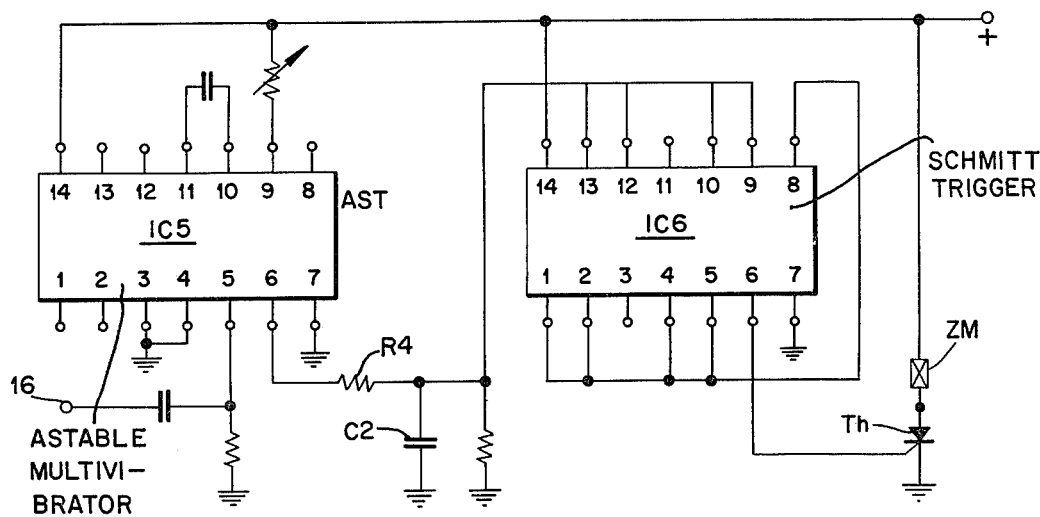
FIG. 7 shows an evaluating circuit.
Figure 8:
FIG. 8 shows an impulse diagram of an N-path filter.

Illustrated in FIG. 7 is an exemplary circuit for the evaluating circuit 17. This circuit operates with an astable multivibrator IC5, an integrating element C2, R4, and a Schmitt-Trigger IC6 which is connected to the output of the latter. The multivibrator is obtainable under No. 74121 and the Schmitt-Trigger under the No. 2413 as an integrated component. In total, the output signal of the Schmitt-Trigger leads to the ignition or triggering of a thyristor Th, as soon as a known impulse number occurs at the input 16. These impulses are then shaped and integrated through the evaluating arrangement. When the integration result exceeds a threshold value, the thyristor Th is actuated. This leads to the detonation of the igniter means ZM.

The divider circuit pursuant to FIG. 6 becomes superfluous when the transmitter 6 is connected directly to one of the NOR-gates of the integrated component IC1.

Illustrated in FIG. 9 is a further exemplary embodiment of the invention. In this embodiment, the transmitting frequency fs of the transmitter 6' is carried out in accordance with the median band frequency of the band-pass filter 11' by means of a regulating circuit 26. The band-pass filter 11' is connected to the output of the amplifier 13. The latter is located behind the receiver 14. The output of the band-pass filter 11' is transmitted to the input 27 of the regulating circuit 26. Additionally, it is connected to the input 28 of a threshold circuit 29 which transmits a signal to the evaluating unit 17 as soon as its input signal exceeds a predetermined amplitude value.

The regulating circuit 29 is constructed as a phase-locked loop circuit. The circuit incorporates a frequency mixer 30, a low-pass filter 31, a regulating or variable-gain amplifier 32, and a voltage-controlled oscillator 33. At input 27 there is provided a signal which is filtered out of the enforcedly occuring noise of the amplifier 13 by means of the band filter 11'. The median band frequency of the band filter 11', for example, lies at 10 kHz. Moreover, applied to the frequency mixer 30 is the output signal of the oscillator 33, whose reference frequency similarly consists of 10 kHz. The frequency mixer forms a signal with frequencies fe+fs and fe−fs. Through intermediary of the low-pass filter 31, the frequency fe−fs is filtered out and conducted to the variable-gain amplifier 32. The latter forms a control voltage Ur which is zero at the coincidence of the two frequency values fe and fs, and which increases with an increasing difference. In the event that the frequencies fe and fs deviate from each other through aging effects or tolerances of the components, the frequency fs is subsequently so regulated as to coincide with the frequency fe. When at the output of the filter 11' there is only applied the signal which is filtered out of the noise of the amplifier 13, then the threshold switch 29 is not activated. Only when the receiver has a signal of the frequency fs=fe emanating from the transmitter conducted thereto, then the threshold switch 29 will activate and, in the described manner, will lead to an initiation of the signal.

In the described circuit arrangements it is assured that the median band frequency of the band-pass filter and the transmitting frequency cannot deviate from each other in an undesired manner. Unavoidable frequency deviations are balanced through intermediary of the circuit arrangements.

While there has been shown what is considered to be the preferred embodiment of the invention, it will be obvious that modifications may be made which come within the scope of the disclosure of the specification.

What is claimed is:

1. In an opto-electronic measuring apparatus, in particular for a projectile detonator, for the delivery of a signal upon the reaching of a predetermined distance between a moving body and a surface; including a transmitter emitting signals at a transmitting frequency; a first lens rendering said impulses optical; a second lens for focusing a scattered-back portion of the optical impulses from the surface; and a receiver having a receiver-amplifier for receiving the scattered-back optical impulses, the improvement comprising: a band-pass filter having a narrow frequency pass range connected to the output of said receiver-amplifier; a regulating circuit connected intermediate said band-pass filter and said transmitter for correlating the median frequency of the frequency pass range of the band-pass filter and the transmitting frequency of the transmitter; and an evaluating circuit connected to the output of said band-pass filter for delivery of said signal.

2. A measuring apparatus as claimed in claim 1, comprising a control device for commonly synchronizing the transmitting frequency of the transmitter and median band frequency of said band-pass filter.

3. A measuring apparatus as claimed in claim 2, said control device comprising an impulse generator, and said filter being an N-path filter.

4. A measuring apparatus as claimed in claim 3, comprising a frequency divider connected between said impulse generator and said transmitter, said frequency divider dividing the impulse sequences of said impulse generator by a factor which corresponds to the number of the paths of the N-path filter.

5. A measuring apparatus as claimed in claim 1, said regulating circuit having the transmitting frequency of said transmitter follow the median frequency of said band-pass filter.

6. A measuring apparatus as claimed in claim 5, comprising a threshold value switch connected to the output of said band-pass filter, said switch being activated only in response to a signal exceeding the noise level of said amplifier.

7. A measuring apparatus as claimed in claim 5, wherein said regulating circuit comprises a phase-locked loop circuit.

* * * * *

UNITED STATES PATENT AND TRADEMARK OFFICE
CERTIFICATE OF CORRECTION

PATENT NO. : 4,223,607
DATED : SEPTEMBER 23, 1980
INVENTOR(S) : MÜLLER ET AL

It is certified that error appears in the above-identified patent and that said Letters Patent are hereby corrected as shown below:

Correct name of first Inventor to read --Udo Müller--

Signed and Sealed this

Third Day of March 1981

[SEAL]

Attest:

RENE D. TEGTMEYER

Attesting Officer

Acting Commissioner of Patents and Trademarks